(12) United States Patent
Fontbonne

(10) Patent No.: US 7,102,136 B2
(45) Date of Patent: Sep. 5, 2006

(54) IONIZING BEAM INSPECTION DEVICE AND PROCESS

(75) Inventor: Jean-Marc Fontbonne, Caen (FR)

(73) Assignee: Centre National de la Recherche Scientifique, (FR)

( * ) Notice: Subject to any disclaimer, the term of this patent is extended or adjusted under 35 U.S.C. 154(b) by 273 days.

(21) Appl. No.: 10/485,936

(22) PCT Filed: May 30, 2003

(86) PCT No.: PCT/FR03/01639

§ 371 (c)(1),
(2), (4) Date: Jan. 30, 2004

(87) PCT Pub. No.: WO03/101528

PCT Pub. Date: Dec. 11, 2003

(65) Prior Publication Data
US 2004/0178361 A1 Sep. 16, 2004

(30) Foreign Application Priority Data
Jun. 3, 2002 (FR) .................................. 02 06778

(51) Int. Cl.
*G01T 1/20* (2006.01)
(52) U.S. Cl. ..................................................... 250/368
(58) Field of Classification Search ................. 250/368
See application file for complete search history.

(56) References Cited

U.S. PATENT DOCUMENTS

| 5,856,673 | A | 1/1999 | Ikegami et al. |
| 5,905,263 | A | 5/1999 | Nishizawa et al. |
| 6,066,851 | A | 5/2000 | Madono et al. |
| 6,225,622 | B1 | 5/2001 | Navarro |
| 6,518,580 | B1 * | 2/2003 | van Bibber et al. ......... 250/397 |
| 2003/0150983 | A1 * | 8/2003 | Nishizawa et al. ...... 250/252.1 |
| 2004/0238749 | A1 | 12/2004 | Fontbonne et al. |

FOREIGN PATENT DOCUMENTS

| FR | 2 822 239 A1 | 9/2002 |
| JP | 2001 056381 A | 2/2001 |
| JP | 2001 346894 | 12/2001 |

* cited by examiner

Primary Examiner—Constantine Hannaher
(74) Attorney, Agent, or Firm—Hutchison Law Group PLLC

(57) ABSTRACT

A beam inspection device includes an inspection head having a scintillator and at least one ionizing radiation diffuser block connected to the scintillator. At least one image may be formed from at least one part of the inspection head that includes the scintillator. The device may discriminate between a scintillation light from the scintillator and stray Čerenkov light in the inspection head. The scintillator includes at least one heavy plate having two principal opposing faces, the plate being approximately homogeneous with the scintillation material, and the diffuser block covers at least one of the principle faces of the scintillator plate.

23 Claims, 3 Drawing Sheets

IONIZING BEAM INSPECTION DEVICE AND PROCESS

TECHNICAL FIELD

This invention concerns a process and a device for the inspection of an ionising beam. It also concerns dosimetry and radiotherapy devices which use beam inspection.

The invention has general applications for any inspection or mapping operations of an ionising beam. It has particular applications in the calibration and control of medical equipment such as radiotherapy equipment.

PRIOR ART

Radiotherapy is a medical treatment technique which essentially consists of irradiating tissue using ionising radiation such as X, β and/or γ radiation. The particular aim of the irradiation is to destroy the cancerous tumours of a patient.

When applying an ionising beam to the cancerous tissues, it is inevitable that healthy tissue will also be exposed. Also, so as to limit the dose of radiation received by the healthy tissue around the tumours, the patient is generally submitted to several exposures. The exposures are carried out with beams from different directions, but which each time intercept a single area corresponding to a tumour to be destroyed. In this way, the tumour is subjected to several exposures. However, the surrounding healthy tissue is only subjected to exposure from the beams in whose path they are aligned.

The control of the beams, and in particular their positioning, their opening and their intensity, is controlled by firing ballistic software also called "planning RT" software.

A precise control of the beams is necessary to obtain a differential exposure of the healthy tissue and cancerous tissue. The doses received by the tissues must be controlled to a degree of error of less than or equal to 5%. Indeed, too great a dose risks destroying or damaging healthy tissue while too low a dose risks leading to a recurrence of the cancer.

The ionising beams are not generally monochromatic, but are made up of a mixture of different radiation energies. The composition of the beams is sensitive to obstacles, e.g. diaphragms, encountered along their trajectory. So, the dose of radiation received by a tissue or by a given area of tissue depends on a great number of parameters which are difficult to predict. It is difficult to accurately and fully predict the dose received at each point by an irradiated volume by calculation.

So, to accurately control the beam firing ballistic software, the beams are inspected to determine the dose of radiation that they are expected to deposit at any point of a body to which it is subjected.

One type of well-known inspection device has gas ionisation chambers which can be moved into a beam. These chambers are not, however, sensitive to all the radiative components of the ionisation beam to which they are subjected, and have a different absorption behaviour to that of the living tissue to be irradiated. Furthermore, the ionisation chambers do not take into account the phenomenon of diffusion of the radiation by tissue around an explored area. The result of this is that the effect of the ionisation of the chambers is different to the effect of a dose received by tissue exposed under the same conditions. To approach this properly, these chambers must be plunged into a liquid—water—which has fairly similar characteristics to that of living tissue.

Another type of inspection device has liquid ionisation chambers placed in the field of a beam. The use of a liquid gives the chambers absorption properties much closer to that of living tissue. However, the low mobility of the ions in the liquid, and the interference phenomena of the recombination of the ions formed by the radiation, makes the response of these inspection devices slow and non-linear.

Finally, scintillator inspection devices are well known. These devices have a multitude of scintillators which are each attached to an optical fibre. The role of this optical fibre is to relay the signal outside the beam in order to be able to ensure its reading in an environment that is not polluted by the ionising radiation. A bundle of optical fibres constitutes an inspection head. The bundle can have alternating scintillating fibres and non-scintillating fibres.

Such devices have a very high manufacturing cost, linked in particular to the layout of the fibres. Furthermore, the resolution of the devices is limited by the size of each individual scintillator and by how many there are; in the present case, the number of fibres and their diameter.

Finally, difficulties arise due to a stray light, called Čerenkov light, which occurs in addition to the scintillation phenomenon.

A more detailed illustration of the prior art given above can be found in documents (1) to (5). The references to these documents are given at the end of the description.

DESCRIPTION OF THE INVENTION

The purpose of the invention is to propose a beam inspection device which does not have the limitations or problems mentioned above.

One aim in particular is to propose a simple inspection device, which is relatively cheap, and which allows for accurately reporting the doses expected to be deposited by a beam into a living tissue.

One aim is also to propose a device free of the interfering effects of Čerenkov light.

The purpose of the invention is also to propose beam inspection processes and dosimetry and radiotherapy devices that use these processes.

To achieve these aims, the invention is, more precisely, an inspection device for one or more beams with:

- an inspection head comprising a scintillator—a material which reacts to the presence of radiation by emitting a light—and at least one ionising radiation diffuser attached to the scintillator,
- a primary means of forming at least one image corresponding to at least one part of the inspection head that includes the scintillator.

In accordance with the invention, the scintillator has at least one heavy plate which is approximately homogeneous with the scintillation material, having two principal opposing faces. The diffuser block covers at least one of the principal faces of the scintillator plate. The said device also has the means to distinguish between scintillation light and stray Čerenkov light in the inspection head.

With the invention, the resolution of the device is no longer linked to the construction of the scintillator. It depends essentially on the image that is formed by the scintillator plate. Furthermore, the use of a heavy and approximately homogeneous scintillator considerably reduces its manufacturing cost.

The scintillator plate should preferably be very thin. It could, for example, be formed by a sheet with a thickness of between 1 and 5 mm and whose principal faces present a surface of between 100 and 900 cm². The plate can have the general shape of a circle or rectangle.

The plate allows, by means of its scintillation properties, for the reporting, according to the plane that it defines, of the dose of radiation received at each of its points. The intensity of the scintillation light at each point of the scintillator plate is in fact related to the dose received. In this way, the plate allows for making a kind of "section" of the beam along a plane.

The device may if necessary be fitted with a means for relative movement between the inspection head and the source of a beam to be inspected. This movement, by translation or rotation, allows for successively exploring different planes and thereby learning the doses likely to be deposited in a volume.

The purpose of the ionising radiation diffuser, which is attached to the scintillator plate, is to simulate the diffusion of the radiation through the environment of a given target. More precisely, the scintillation at each point of the plate shows not only the dose received directly at this point, but also the dose received outside the plate, in the diffuser, next to the point in question. The diffuser has the advantage of simulating tissue which is not insulated within the body of a patient. A diffuser block may be provided on one only, but preferably both faces of the scintillator plate. The thickness of the diffuser blocks may vary depending on the scale of the diffusion phenomenon that is wished to be taken into account. For scintillator plates within the size ranges mentioned above, diffuser blocks of a thickness between 150 and 400 mm can be used, for example. The blocks cover all or part of the free faces of the scintillator plate.

To use the device in the context of radiotherapy equipment, the scintillator material and the material of the diffuser block or blocks should preferably be materials with radiation absorption coefficients close to those of living tissue. The diffuser blocks should be, for example, blocks made from a plastic material such as PMMA (Plexiglass), polyvinyltoluene or a transparent plastic material containing Titanium oxide for example. The scintillating material of the plate should be, for example, a material such as BICRON BC430.

The means of forming an image can have one or more cameras, and in particular CCD type cameras. The output signal from the cameras can be used to calculate doses depending on the luminous intensity in different parts of the image.

To facilitate the capture of the scintillator image by the camera, at least one diffuser block can be made in a transparent material. The light can then disseminate freely through the block to the camera. The diffuser block can also be fitted with a mirror to bend the light towards the camera when this is not provided for in its prolongation.

The transparent diffuser block subjected to the ionising beam may give rise, depending on the beam's energy, to a stray light also called Čerenkov light. Čerenkov light comes from the relativistic electrons of the ionising beam which disseminate into the material at a speed greater than that of the dissemination of the light in the material. This phenomenon occurs in a quite marginal way in the scintillator, and to a much greater extent in the diffuser blocks, due in particular to their greater thickness. Stray Čerenkov light is added to the scintillation light and is liable to distort the calculation of the doses of radiation deposited by the ionising beam.

In order to prevent this problem, the device of the invention can be equipped with different means of distinguishing between Čerenkov light and scintillation light. The evaluation of the contribution of Čerenkov light can consequently be taken into account when calculating doses of radiation received by the scintillator.

The means of discrimination have, for example, a shutter placed between the diffuser block and the scintillator. The shutter is set to opaque in a light likely to be emitted by the scintillator and transparent in an ionising beam which may be inspected.

In this way, two scintillator images can be captured through the transparent diffuser block. A first image, with the shutter open, comprises a component of scintillation light and a component of Čerenkov light. Under the same conditions of exposure to the beam, a second image, made with the shutter closed, only has the Čerenkov component. The Čerenkov component can therefore be eliminated from the first image by subtracting, point by point, the luminous values of the second image. This operation can be done with a digital computer.

In a simplified process, the shutter can be summed up as being a simple mask which hides a small part of the scintillator. The Čerenkov component is then calculated for the whole of the image using a fraction of the image which corresponds to the location of the mask.

However, in an improved process, the shutter may be an electrically controlled liquid crystal shutter. The electrical control changes the liquid crystal from a transparent state in scintillation light to an opaque state in scintillation light and vice versa.

As a variation, the means of discrimination between Čerenkov light and scintillation light can also have at least one other means for forming an image from the inspection head which is sensitive to scintillation light and/or Čerenkov light which is different from that of the first means of forming an image. Calculation methods may then be provided to establish the contribution of Čerenkov light and/or scintillation light by comparing the images from the first and second means of forming an image.

The first and second means of forming an image can have two or more cameras respectively, attached to different coloured spectral filters. The spectral filters will only allow the spectral bands selected from the light from the inspection head to pass through to the cameras. Each camera therefore constitutes a means for forming a different image.

The first and second means of forming an image can also have a single camera attached to a mechanism which allows for successively placing two or more different spectral filters in the trajectory of the light. In this case, the single camera, attached to each of the different filters, is considered as being a different means of forming an image each time. Indeed, the filters allow for the capturing of several images in different light spectra. If necessary, the filters can also be allocated to several parts of the scope of a single image captured by the camera.

The intensity $I_\lambda$ of the light of the $\lambda$ wavelength received at a point on the image can be broken down as follows:

$$I_\lambda = a \times S + b \times C$$

In this expression, S is a contribution of scintillation light and C the contribution from the Čerenkov effect. The parameters a and b are proportionality coefficients which link C and S respectively to the scintillation light and Čerenkov light produced. The parameters a and b can be determined experimentally, by using, for example, an ionising beam of known characteristics. The parameter "a" can be determined in such a way that S directly represents the dose of radiation received locally by the scintillator. This supposes that, in a wavelength spectrum considered for capturing the images, there is a proportionality between the dose of radiation received by a zone of the scintillator and the luminous intensity of scintillation emitted by this zone. This aspect is looked at in more detail after the description.

The simplified example given above illustrates the use of two filters which allow the λ wavelengths corresponding to green and blue to pass through. It could be written as:

$$I_{green}=a_1 \times S + b_1 \times C$$

and $$I_{blue}=a_2 \times S + b_1 \times C.$$

The parameters $a_1$, $a_2$, $b_1$ and $b_2$ are of the same type as the parameters a and b given above.

The dose of radiation received which contributed to the forming of the scintillation light can be put in the following form:

$$S=(b_2 \times I_{green} - a_2 \times I_{blue})/(a_1 \times b_2 - a_2 \times b_2)$$

In other words we have:

$$S=k1 \times I_{green} + k2 \times I_{blue},$$

where k1 and k2 are the proportionality coefficients. The coefficients can be calculated in the way given above, or they can be established using one or more ionising beams of known characteristics.

The Čerenkov light contribution C can also be calculated in a similar way.

A greater number of coloured filters allows for establishing other equations for determining the dose of radiation received at each point of the scintillator.

It should be noted that the $I_\lambda$ intensities are those from a small point or zone of the image and relate to a corresponding point or zone of the scintillator.

According to another possibility of using the means of discrimination between scintillation light and Čerenkov light, they can have a polariser placed between the scintillator and a transparent diffuser block in view of at least one means of forming an image. One or more analysers are then attached to the means for forming an image.

The function of these means of discrimination is based on the feature that the Čerenkov light and scintillation light are not polarised. This results essentially from the statistical character of the phenomena at the source of these lights.

By placing a polariser between the scintillator and the transparent diffuser block through which the scintillation light travels, the scintillation light is selectively polarised. Furthermore, the analyser for the means of forming an image, affects, to a greater or lesser extent, the intensity of the scintillation light, depending on its positioning, but does not affect the Čerenkov light.

The contribution of the Čerenkov effect can now be evaluated, for example, by blocking out the scintillation light. The Čerenkov contribution can then be subtracted from the total light, if the analyser is perpendicular to its extinguished position, to determine the scintillation component.

The analyser can also be mounted to revolve between the diffuser block and the means for forming an image. It is also possible to use means for forming an image in the form of two or more cameras fitted with two or more crossed polarisers which respectively supply two or more images from the scintillator and the diffuser block.

The scintillation light, and therefore the dose D received in a given zone of the scintillator, is thus as follows:

$$D = a \times I_\rightarrow + b \times I_\uparrow$$

The parameters a and b are still parameters likely to be calculated or directly established by experimentation, using beams of known characteristics and $I_\rightarrow$ and $I_\uparrow$ are the luminous intensities of the zone in question given by the cameras fitted with crossed polarisers (analysers). The expression corresponds to a configuration that only uses two separate analysers. A greater number of analysers may be used.

It should be noted that multiple cameras may be replaced with a single camera which alternatingly receives the light from the inspection head through different crossed orientation analysers. Different parts of the camera's scope can also simultaneously receive the light from the different analysers. Finally, a single revolving analyser allows for obtaining different and crossed analysis orientations at different times. In this way, it replaces the need for more than one analyser.

Some additional improvements can be envisaged. For example, a reflector can be put on one of the principal faces of the scintillator which is opposite a face with the transparent diffuser block, i.e. opposite the face turned towards the means for forming an image.

According to another improvement, the inspection head may have a mirror to bend the scintillation light towards the means for forming an image. This characteristic may offer several advantages. One advantage is to protect the means of forming an image from the ionising beams to be inspected. Another advantage could be to limit a relative movement to a single inspection head without involving the means of forming an image. As an example, for the sweeping of a beam to be inspected in a rotary movement of the inspection head, the bending mirror can be placed in such a way as to bend the light towards a camera placed in the rotation axis.

An inspection device as described is able to provide values relating to the dose of radiation provided by a beam to be inspected. It is also possible to create an absolute measurement dosimeter by equipping the device with one or more calibration ionising chambers. These small chambers can be housed in the scintillator or directly next to it. Calibration takes place, for example, by adjusting the radiation dose values determined from the image from the scintillator for one or more zones that correspond to the locations of the calibration chambers, to the dose values determined by the calibration chambers themselves.

An accurate calibration to establish the Čerenkov light can also be carried out by using a scintillator with one or possibly more dead zones. A dead zone is a zone that does not emit scintillation light, but can emit. Čerenkov light under the influence of an ionising beam. This could be, for example, a cavity in the scintillator plate filled with a transparent plastic material with light absorption properties similar to that of the scintillator material. The image of the dead zone, free of the scintillation component, allows for directly ascertaining the interfering effect of Čerenkov light.

According to an additional improvement of the invention, the scintillator may have two or more plates of scintillating material with absorption coefficients of different energy dependencies. The means for forming a tangible image selectively in each of the plates is thus provided.

It is preferable to use scintillating materials with absorption coefficients proportional to those of the tissue to be irradiated. The proportionality is not, however, necessarily perfect for the whole energy spectrum of the beam to be inspected. So, corrections may be made to the multiplier coefficients which link the intensity of a recorded scintillation light and a dose that a tissue would actually receive.

By using several plates of scintillating material for which the absorption coefficients evolve differently according to the energy of an inspected beam, it is possible to calculate a dose received, despite non-linear terms. The dose D can effectively be calculated according to linear terms and quadratic terms with an expression in the following form:

$$D = \sum_i k_i S_i + \sum_{ij} k_{ij} S_i S_j$$

In this expression, $k_i$ and $k_{ij}$ are the proportionality coefficients respectively of the linear and quadratic components and $S_i$ and $S_j$ represent the scintillation contributions of the different scintillator plates. The coefficients can be established by calibration.

The contributions of the different scintillator plates can be distinguished by forming images from the different plates on separate cameras or by using scintillators which emit scintillation light in false spectra. In this case, the distinction can be made with spectral filters placed in front of one or more cameras. The use of spectral filters is similar to what has already been described for distinguishing Čerenkov light and is not therefore covered here.

As stated above, the device can be used in a dosimeter. The dosimeter also has a calculation unit, to establish, using the images provided by the device, the distribution data for a dose of radiation provided by a beam. In other words, a calculation is made for different zones of a plane or volume of the dose of radiation received according to the scintillation light recorded for this zone.

The inspection device for the beam can also be integrated into radiotherapy equipment which also has one or more sources of radiation.

The inspection device can be adapted to inspect different types of beams from different types of sources. The device may in addition have a diffuser block with housings for a source of radiation, with the block having at least one face that can be used in the inspection head. Such a block can be mused to inspect beams emitted by a source of radiation likely to be within the body of a patient.

The invention also concerns a process for the inspection of a source by means of a device as described above, in which at least one image from the scintillator is formed, and a calculation is made according to the different parts of the image of the local doses of radiation received by the scintillator. Different aspects of this process and its use have already been described, above with reference to the functioning of the device. These aspects are not covered here.

Other characteristics and advantages of the invention will be given in the description that follows, with reference to the figures in the attached drawings. This description is given purely for illustrative purposes and is not exhaustive.

DETAILED DESCRIPTION OF MODES OF USE OF THE INVENTION

In the following description, identical, similar or equivalent parts of the various figures are marked with the same reference numbers to facilitate the relationship between the figures. Furthermore, with the aim of clarity of the figures, not all the elements are represented according to a uniform scale.

Figure 1:
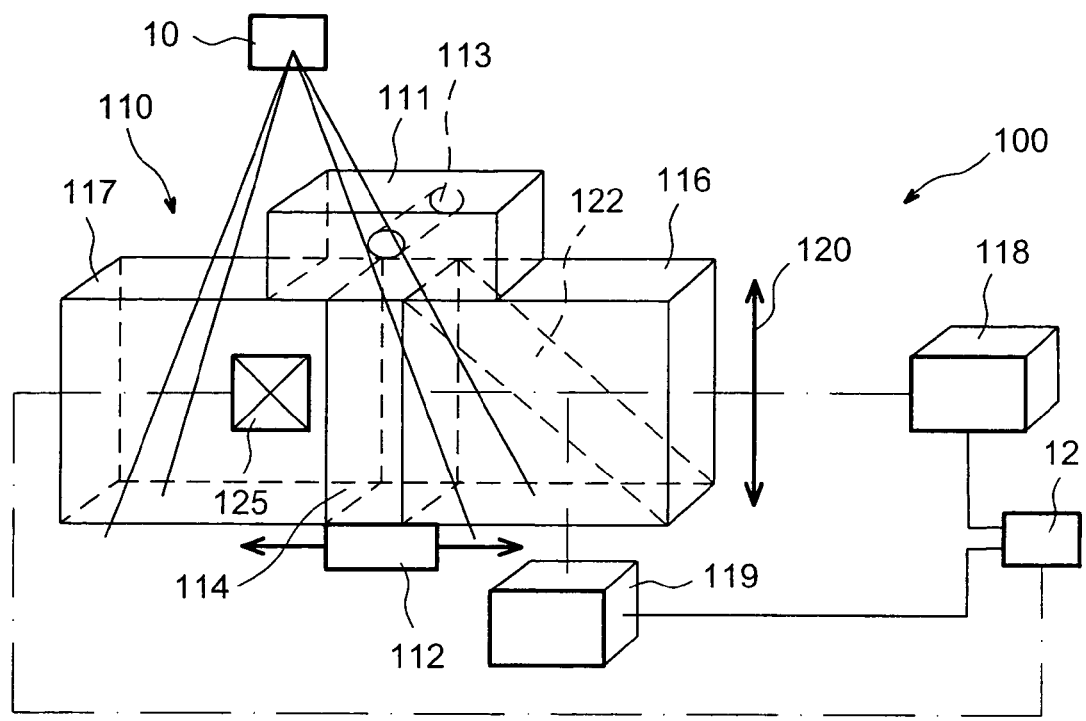
FIG. 1 is a simplified schematic representation of a radiotherapy device that uses an inspection device in accordance with the invention.

FIG. 1 shows a radiotherapy device with a beam source 10, a device for inspecting the beam 100 and a calculation unit 12 for establishing a mapping of the beam. The mapping is to determine the dose of radiation that the beam is likely to deposit at any point of the body of a patient.

The patient is modelled by an inspection head 110 on the inspection device. This is mounted on an actuator 112 to move the head in order to pass the whole of the intercepted field through the beam. The actuator may be designed for translational movements in one or more directions, and rotary movements if necessary. Although it can also be moved, in the example illustrated, the source 10 is considered as being fixed.

The inspection head 110 has a scintillator in the form of a thin plate of scintillating material 114, i.e. a thin plate of material which is able to convert ionising radiation into light radiation. This could be, for example, a Bicron BC 400 type plate. For reasons of clarity, the thickness of the plate is greatly exaggerated in the figures. The plate in the material is flanked on its principal faces by two transparent diffuser blocks 116 and 117.

In alignment with the block 116 is a charged couple device (CCD) 118 which constitutes a means for forming an image. The camera provides images in the form of a data signal sent to the calculation unit 12. The calculation unit, which can also control the movement of the inspection head, allows for calculating the characteristics of the beam and in particular the doses of radiation that it is expected to deposit at different parts of an exposed body. The reference 120 designates in summary a lens which allows for the forming of an image in the camera from the scintillator plate and the diffusion blocks. The light emitted by the scintillator 114 passes through the diffuser block 116 before reaching the camera.

A mirror 122, indicated in dashed lines, can be attached to one of the diffuser blocks 116 in such a way as to send all or some of the scintillation light and Čerenkov light to a second camera 119. This is also connected to a lens, which is not shown.

Reference 125 indicates in summary a beam detector which allows for detecting the presence or absence of a beam. This could be, for example, a rudimentary silicon detector. The detector 125 can be used to advantage if the source of the beam 10 is a pulsing source. It in fact allows for synchronising the capture of images by the calculation unit on the beam pulses and thus avoids the influence of interference in the absence of a beam.

To analyse the radiation provided by a source likely to be within the body of a patient, the device can have an additional diffuser block, marked with reference 111. This block is provided with a housing 113 for receiving such a source. Furthermore, it has an adjustable face on the inspection head. For reasons of simplification, the shape of the block 111 represented is rectangular. More complex shapes representative of the organs to be irradiated can however be provided.

Figure 2:
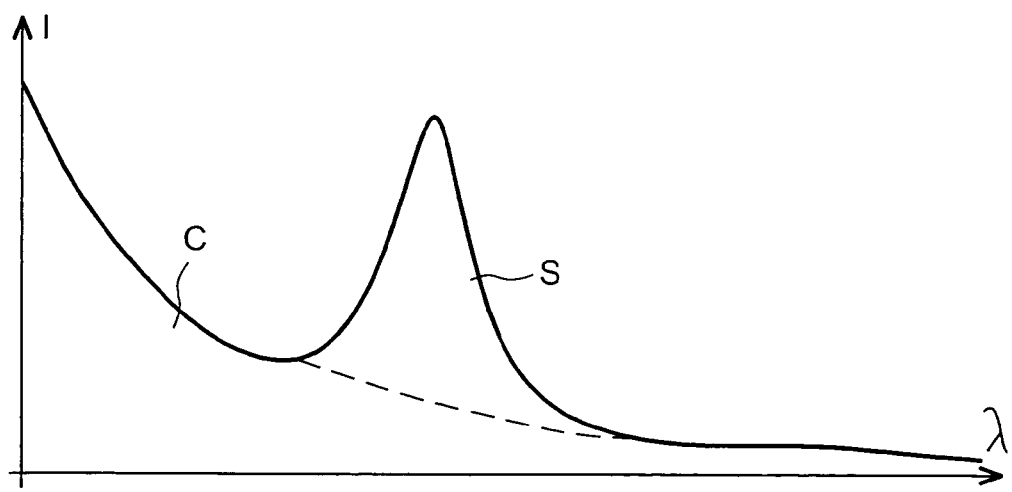
FIG. 2 is a graphic expressing, depending on the wavelength, the intensity of a scintillation light and a stray Čerenkov light. The graphic is in free scale.

FIG. 2 shows the course of the distribution, depending on the wavelength, of the intensity of the light received at a point from the image formed by the camera. The light includes a scintillation light component and a stray light component, called Čerenkov light, which has already largely been covered. It can be seen that the light received has a background C which decreases with the length of the wave. This is Čerenkov light. To this background is added a relatively narrow peak S which corresponds to the scintillation light. It is impossible to see directly the intensity of the scintillation, and therefore the dose of radiation received, because at the scintillation peak, a background of Čerenkov light is added. For some wavelengths at the very least, this background is too great to be ignored.

The following figures, described below, show a certain number of characteristics which aim to distinguish between scintillation light and Čerenkov light. In these figures, only the parts of the inspection device needed for understanding are represented. For the other parts, FIG. 1 can be referred to.

Figure 3:
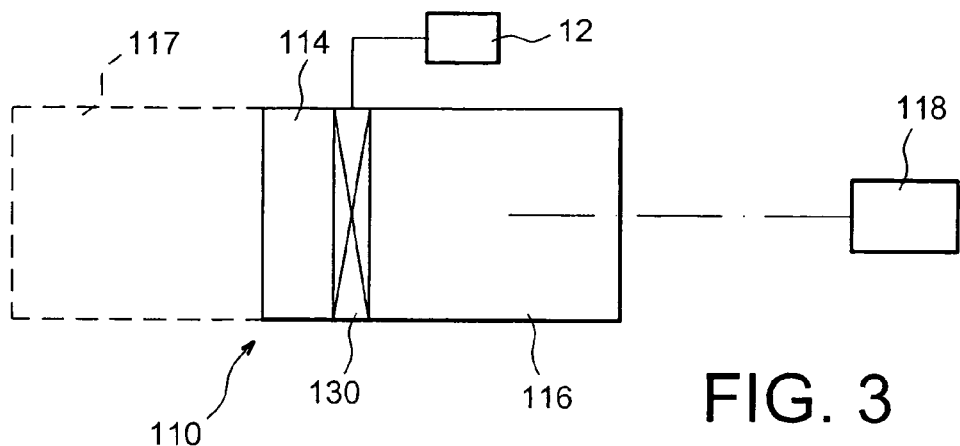
FIGS. 3, 4, 5 and 6 are simplified schematic representations of inspection devices in accordance with the invention, equipped with various means of discrimination between a scintillation light and a stray Čerenkov light.

FIG. 3 shows an inspection head which has a shutter 130 between the scintillator plate 114 and the diffuser block 116, which is turned towards the camera 118. This example shows a liquid crystal shutter. The level of transparency of the shutter in scintillation light is controlled by an electric control device or possibly by the calculation unit 12 as described in relation to FIG. 1. The shutter is always transparent in the ionising beam. So, if it is closed, the camera forms a Čerenkov light image. Conversely, if the shutter 130 is open, the image includes both the Čerenkov light and the scintillation light. The difference between the two images allows for finding the scintillation light contribution on its own. Put simply, it is considered that the Čerenkov light produced in the scintillator plate is negligible compared to that produced in the diffuser blocks. This approximation is valid insofar as the scintillator plate is thin in comparison with the diffuser blocks. The diffuser block 117, opposite the camera 118, is represented by dashed lines to indicate that it can be removed if necessary.

Figure 4:
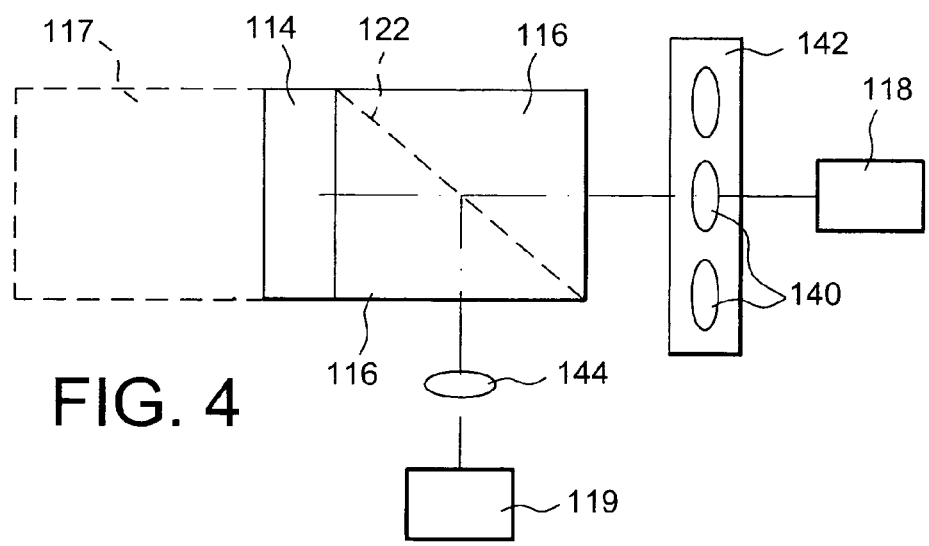

FIG. 4 shows a camera 118 attached to asset 142 of spectral filters which only allow the narrow lines of light to pass. The capture of several images, through the various filters 140 of this set, also allows for the calculation of the quantity of scintillation light and thus the dose of radiation received by the scintillator. The principle of the calculation has already been explained and is not covered here. The images captured through the various filters 140 can be taken successively, e.g. by moving the set of filters 142 in front of the camera 118. Some images can also be captured simultaneously by means of a second camera 119 fitted with a second filter 142 which is different from the filter 140 attached to the first camera 118. In the example illustrated, the second camera receives some of the light through a semi-transparent bending mirror 122.

Figure 5:
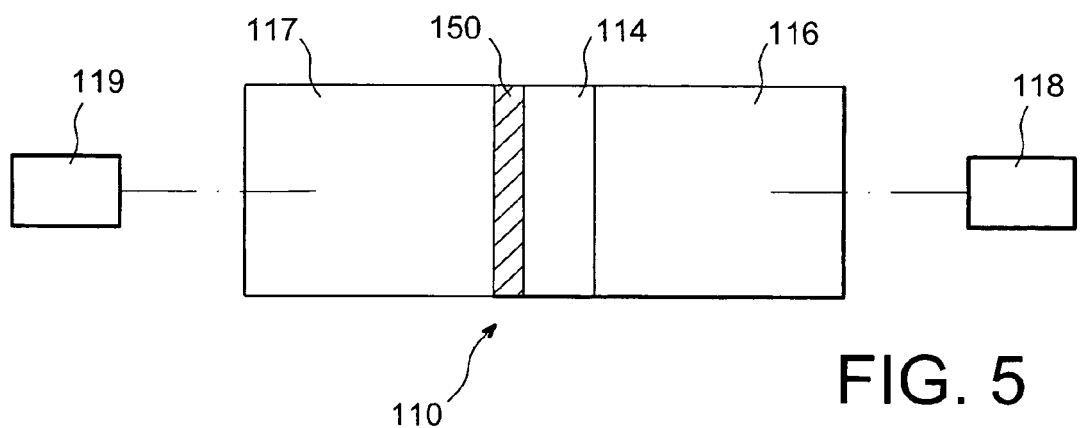

FIG. 5 shows an alternative embodiment of the inspection head, which has an opaque mirror 150 placed between the scintillator plate 114 and one of the diffuser blocks 117. The mirror 150 has two functions. The first function is that of a reflector. In fact, the mirror 150 allows for sending a greater part of the scintillation light to the first camera 118. This camera 118 therefore receives the scintillation light and the Čerenkov light created in one of the transparent diffuser blocks 116.

In addition, the mirror can also have a second function. This is the function of a screen to stop the scintillation light from reaching the second camera 119 placed opposite the second transparent diffuser block 117. In this way, the second camera only receives the Čerenkov light created in the second diffuser block 117. Using the Čerenkov light received by the second camera 119, and taking into account the characteristics of the diffusers 116 and 117, it is possible to evaluate by analogy the contribution of Čerenkov light in the image formed by the first camera 118. This contribution can then be removed by calculation from the image of the first camera 118.

Figure 6:
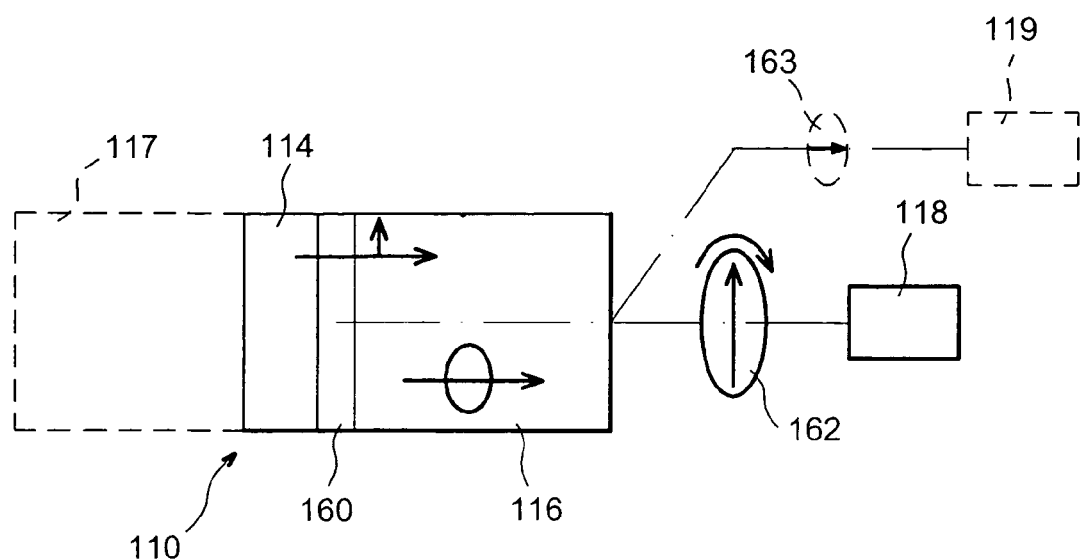

FIG. 6 again shows another embodiment, in which a polariser 160 is placed between the scintillator plate 114 and a first diffuser block 116. The polariser allows for the polarisation of the initially isotropic scintillation light. However, the Čerenkov light that appears in the diffuser block 116 opposite the camera is not polarised.

A distinction is then made between both light contributions using an analyser 162 positioned between the first diffuser block 116 and the camera 118. The analyser may be fixed or rotating and allows for blocking out all or some of the scintillation light. This blocking out does not affect Čerenkov light which is not polarised. In this way, the relative contribution of Čerenkov light and scintillation light can be established. The principle for determining the part which is the scintillation light has already been described. By way of a variation, the single camera with an analyser can be replaced with a set of two cameras 118, 119 attached to two crossed analysers 162, 163. In the example given in FIG. 6, the second diffuser block 117, if present, is isolated from the scintillator 114 by a Čerenkov light opaque material.

Figure 7:
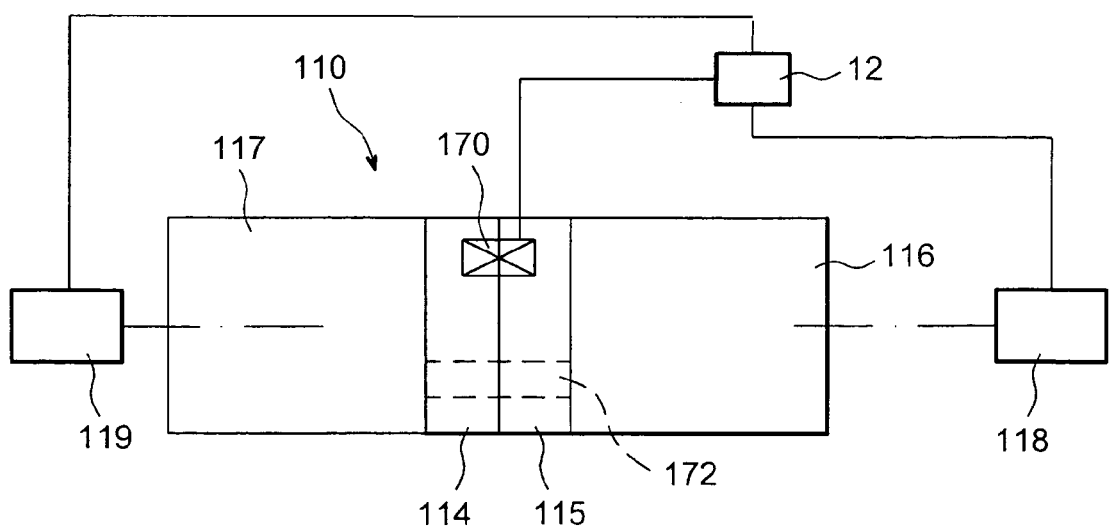
FIG. 7 is a simplified schematic representation of an improved inspection device, in accordance with the invention.

FIG. 7 shows a particular embodiment of the inspection head 110, in which it has two scintillator plates 114, 115. The two plates are joined or possibly separated by an opaque scintillation light shield or a mirror. The scintillation light from the two plates is captured by two cameras 118, 119. It passes through two transparent diffusers 116, 117 respectively, which are attached to the principal faces of the plates. When the two scintillator plates 114, 115 emit scintillation light in false spectra, their light can be captured by a single camera attached to selective spectral filters. The images provided by the two cameras, or possibly a single camera, are used to locally calculate the doses of radiation received according to the weighted contribution of each of the scintillators. As stated previously, the weighting can be linear and/or quadratic.

Other spectral filters and/or other means of distinguishing Čerenkov light, as described already, may also be used.

Reference 170 shows a small ionisation chamber integrated into the scintillator plates, and possibly partly into the diffuser blocks. This chamber sends a signal towards the calculation unit 12. This signal can be compared with a dose measurement made using images from the cameras, for calibration purposes or to measure the absolute value of the dose.

Finally, reference 172 designates a small dead zone in the scintillator plates 114, 115. This would preferably be a zone in a non-scintillating material which has absorption properties close to those of the scintillator. The image from this dead zone allows for directly giving an evaluation of the Čerenkov contribution. This contribution can also be used for a calibration of the dosimeter. Finally, the use of a dead zone allows, if necessary, for the evaluation of the proportion (low) of Čerenkov light produced in the thickness of the scintillator plates.

REFERENCE DOCUMENTS

1) JP-2001 056381, Mitsubishi and Electric Corp., Nishiura Ryuichi et all,
2) FR-01 03519
3) U.S. Pat. No. 6,066,851, Mitsubishi, Kunio Madono et all
4) U.S. Pat. No. 5,856,673, Mitsubishi, Kazunori Ikegami et all,
5) U.S. Pat. No. 5,905,263, Mitsubishi, Nishizawa Hiroshi et all.

The invention claimed is:

1. A beam inspection device comprising:
an inspection head comprising a scintillator and at least one ionizing radiation diffuser block connected to the scintillator;
first means for forming at least one image from at least one part of the inspection head that includes the scintillator; and
means for discriminating between a scintillation light from the scintillator and stray Čerenkov light in the inspection head;
wherein the scintillator includes at least one heavy plate having two principal opposing faces, the plate being approximately homogeneous with the scintillation material, and the diffuser block covers at least one of the principal faces of the scintillator plate.

2. The device according to claim 1, wherein the diffuser block is transparent to the scintillation light from the scintillator.

3. The device according to claim 1, wherein the means for discriminating includes at least one second means for forming an image of the inspection head which is sensitive to the scintillation light and the Čerenkov light, the second means for forming an image being different than the first means for forming an image.

4. The device according to claim 1, comprising means for moving the inspection head relative to a source of beams to be inspected.

5. The device according to claim 1, wherein the inspection head includes a mirror configured to bend the light towards the first means for forming an image.

6. A beam inspection device comprising:
an inspection head comprising a scintillator and at least one ionizing radiation diffuser block connected to the scintillator;
first means for forming at least one image from at least one part of the inspection head that includes the scintillator; and
means for discriminating between a scintillation light from the scintillator and stray Čerenkov light in the inspection head;
wherein the scintillator includes at least one heavy plate having two principal opposing faces, the plate being approximately homogeneous with the scintillation material, and the diffuser block covers at least one of the principal faces of the scintillator plate and
wherein the means for discriminating includes a shutter placed between the diffuser block and the scintillator, the shutter being opaque in a light capable of being emitted by the scintillator and transparent to ionizing radiation.

7. The device according to claim 6, wherein the shutter is an electrically controlled liquid crystal shutter.

8. A beam inspection device comprising:
an inspection head comprising a scintillator and at least one ionizing radiation diffuser block connected to the scintillator;
first means for forming at least one image from at least one part of the inspection head that includes the scintillator; and
means for discriminating between a scintillation light from the scintillator and stray Čerenkov light in the inspection head;
wherein the scintillator includes at least one heavy plate having two principal opposing faces, the plate being approximately homogeneous with the scintillation material, and the diffuser block covers at least one of the principal faces of the scintillator plate and
wherein the means for discriminating includes at least one second means for forming an image of the inspection head which is sensitive to the scintillation light and the Čerenkov light, the second means for forming an image being different than the first means for forming an image and
wherein the second means for forming an image is attached to a transparent diffuser block of the inspection head, and the inspection head includes a screen to prevent the scintillator light from reaching the second means for forming an image.

9. The device according to claim 8, comprising a third and fourth means for forming an image that are sensitive to different luminous spectra and are attached to the scintillator and at least one transparent diffusion block of the inspection head.

10. The device according to claim 9, wherein the third and fourth means for forming an image include at least one camera attached to at least two spectral filters.

11. A beam inspection device comprising:
an inspection head comprising a scintillator and at least one ionizing radiation diffuser block connected to the scintillator;
first means for forming at least one image from at least one part of the inspection head that includes the scintillator; and
means for discriminating between a scintillation light from the scintillator and stray Čerenkov light in the inspection head;
wherein the scintillator includes at least one heavy plate having two principal opposing faces, the plate being approximately homogeneous with the scintillation material, and the diffuser block covers at least one of the principal faces of the scintillator plate and
wherein the means for discriminating includes at least one second means for forming an image of the inspection head which is sensitive to the scintillation light and the Čerenkov light, the second means for forming an image being different than the first means for forming an image and
wherein the means for discriminating include a polarizer placed between the scintillator and a transparent diffuser block in view of at least one of the first and second means for forming an image, the device further comprising at least one analyser attached to at least one of the first and second means for forming an image.

12. A beam inspection device comprising:
an inspection head comprising a scintillator and at least one ionizing radiation diffuser block connected to the scintillator;

first means for forming at least one image from at least one part of the inspection head that includes the scintillator; and means for discriminating between a scintillation light from the scintillator and stray Čerenkov light in the inspection head;

wherein the scintillator includes at least one heavy plate having two principal opposing faces, the plate being approximately homogeneous with the scintillation material, and the diffuser block covers at least one of the principal faces of the scintillator plate and wherein the inspection head includes a reflector on one of the principal faces of the scintillator plate, opposite a face with a transparent diffuser block.

13. A beam inspection device comprising:

an inspection head comprising a scintillator and at least one ionizing radiation diffuser block connected to the scintillator;

first means for forming at least one image from at least one part of the inspection head that includes the scintillator; and means for discriminating between a scintillation light from the scintillator and stray Čerenkov light in the inspection head;

wherein the scintillator includes at least one heavy plate having two principal opposing faces, the plate being approximately homogeneous with the scintillation material, and the diffuser block covers at least one of the principal faces of the scintillator plate and wherein the inspection head includes at least one calibration ionization chamber.

14. A beam inspection device comprising:

an inspection head comprising a scintillator and at least one ionizing radiation diffuser block connected to the scintillator;

first means for forming at least one image from at least one part of the inspection head that includes the scintillator; and means for discriminating between a scintillation light from the scintillator and stray Čerenkov light in the inspection head;

wherein the scintillator includes at least one heavy plate having two principal opposing faces, the plate being approximately homogeneous with the scintillation material, and the diffuser block covers at least one of the principal faces of the scintillator plate and wherein the inspection head includes at least one synchronization detector sensitive to radiation pulses.

15. A beam inspection device comprising:

an inspection head comprising a scintillator and at least one ionizing radiation diffuser block connected to the scintillator;

first means for forming at least one image from at least one part of the inspection head that includes the scintillator; and means for discriminating between a scintillation light from the scintillator and stray Čerenkov light in the inspection head;

wherein the scintillator includes at least one heavy plate having two principal opposing faces, the plate being approximately homogeneous with the scintillation material, and the diffuser block covers at least one of the principal faces of the scintillator plate and further comprising a second diffuser block including a housing for a source of radiation and at least one face that can be used in the inspection head.

16. A beam inspection device comprising:

an inspection head comprising a scintillator and at least one ionizing radiation diffuser block connected to the scintillator;

first means for forming at least one image from at least one part of the inspection head that includes the scintillator; and means for discriminating between a scintillation light from the scintillator and stray Čerenkov light in the inspection head;

wherein the scintillator includes at least one heavy plate having two principal opposing faces, the plate being approximately homogeneous with the scintillation material, and the diffuser block covers at least one of the principal faces of the scintillator plate and wherein the scintillator includes at least two plates of scintillating material with attenuation coefficients of different energy dependencies, the plates having at least one second means for forming an image selectively sensitive to each of the plates.

17. A beam inspection device comprising:

an inspection head comprising a scintillator and at least one ionizing radiation diffuser block connected to the scintillator;

first means for forming at least one image from at least one part of the inspection head that includes the scintillator; and means for discriminating between a scintillation light from the scintillator and stray Čerenkov light in the inspection head;

wherein the scintillator includes at least one heavy plate having two principal opposing faces, the plate being approximately homogeneous with the scintillation material, and the diffuser block covers at least one of the principal faces of the scintillator plate and wherein the scintillator plate has at least one dead zone free of scintillation material.

18. A dosimeter comprising:

an inspection head comprising a scintillator and at least one ionizing radiation diffuser block connected to the scintillator;

first means for forming at least one image from at least one part of the inspection head that includes the scintillator;

means for discriminating between a scintillation light from the scintillator and stray Čerenkov light in the inspection head; and a calculation unit configured to establish distribution data of a dose of radiation deposited by a beam using the at least one image;

wherein the scintillator includes at least one heavy plate having two principal opposing faces, the plate being approximately homogeneous with the scintillation material, and the diffuser block covers at least one of the principal faces of the scintillator plate.

19. A radiotherapy device comprising: at least one ionizing beam source; and at least one beam inspection device configured to inspect the at least one ionizing beam source, the beam inspection device including:

an inspection head comprising a scintillator and at least one ionizing radiation diffuser block connected to the scintillator;

first means for forming at least one image from at least one part of the inspection head that includes the scintillator; and means for discriminating between a scintillation light from the scintillator and stray Čerenkov light in the inspection head;
wherein the scintillator includes at least one heavy plate having two principal opposing faces, the plate being approximately homogeneous with the scintillation material, and the diffuser block covers at least one of the principal faces of the scintillator plate.

20. A process for inspecting a beam source using a beam inspecting device having an inspection head comprising a scintillator and at least one ionizing radiation diffuser block connected to the scintillator, first means for forming at least one image from at least one part of the inspection head that includes the scintillator, and means for discriminating between a scintillation light from the scintillator and stray Čerenkov light in the inspection head, the method comprising:
forming at least one image from the scintillator; and
calculating localized doses of radiation received by the scintillator based on the different parts of the image;
wherein the scintillator includes at least one heavy plate having two principal opposing faces, the plate being approximately homogeneous with the scintillation material, and the diffuser block covers at least one of the principal faces of the scintillator plate.

21. A process for inspecting a beam source using a beam inspecting device having an inspection head comprising a scintillator and at least one ionizing radiation diffuser block connected to the scintillator, first means for forming at least one image from at least one part of the inspection head that includes the scintillator, and means for discriminating between a scintillation light from the scintillator and stray Čerenkov light in the inspection head, the method comprising:
forming at least one image from the scintillator; and
calculating localized doses of radiation received by the scintillator based on the different parts of the image;
wherein the scintillator includes at least one heavy plate having two principal opposing faces, the plate being approximately homogeneous with the scintillation material, and the diffuser block covers at least one of the principal faces of the scintillator plate and further comprising:
forming at least two images from the scintillator that correspond to two separate spectral scopes;
wherein the doses of local radiation received by the scintillator are calculated by distinguishing a scintillation light contribution from a light contribution produced by the Čerenkov effect.

22. A process for inspecting a beam source using a beam inspecting device having an inspection head comprising a scintillator and at least one ionizing radiation diffuser block connected to the scintillator, first means for forming at least one image from at least one part of the inspection head that includes the scintillator, and means for discriminating between a scintillation light from the scintillator and stray Čerenkov light in the inspection head, the method comprising:
forming at least one image from the scintillator; and
calculating localized doses of radiation received by the scintillator based on the different parts of the image;
wherein the scintillator includes at least one heavy plate having two principal opposing faces, the plate being approximately homogeneous with the scintillation material, and the diffuser block covers at least one of the principal faces of the scintillator plate and further comprising: selectively polarizing light from the scintillator; and
forming at least two images from the inspection head that correspond to two separate polarization orientations;
wherein the doses of local radiation received by the scintillator are calculated by distinguishing a polarized scintillation light contribution from an unpolarized light contribution produced by the Čerenkov effect.

23. A process for inspecting a beam source using a beam inspecting device having an inspection head comprising a scintillator and at least one ionizing radiation diffuser block connected to the scintillator, first means for forming at least one image from at least one part of the inspection head that includes the scintillator, and means for discriminating between a scintillation light from the scintillator and stray Čerenkov light in the inspection head, the method comprising:
forming at least one image from the scintillator; and
calculating localized doses of radiation received by the scintillator based on the different parts of the image;
wherein the scintillator includes at least one heavy plate having two principal opposing faces, the plate being approximately homogeneous with the scintillation material, and the diffuser block covers at least one of the principal faces of the scintillator plate and further comprising:
using an inspection device comprising a scintillator with at least two scintillator plates having attenuation coefficients with different energy dependencies; and
forming an image from each scintillator plate;
wherein the doses of radiation received are calculated based on weighted contributions of each of the scintillator plates.

* * * * *